United States Patent Office 2,973,640
Patented Mar. 7, 1961

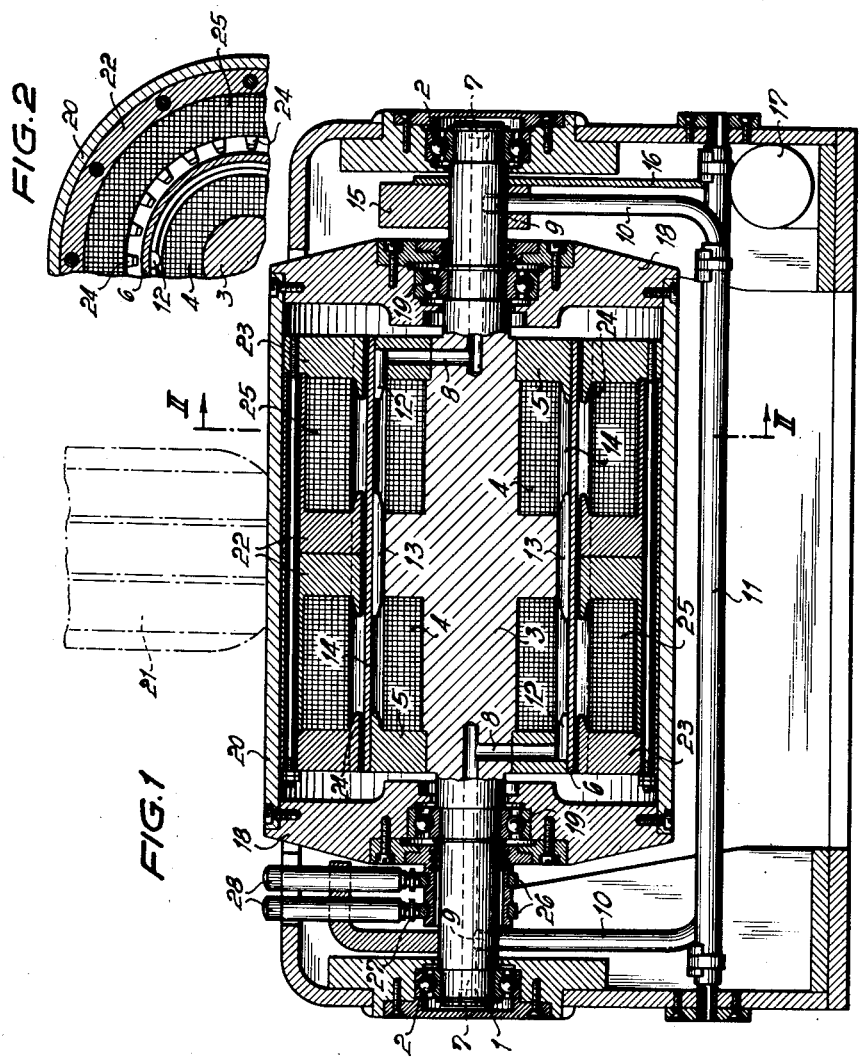

2,973,640

EDDY CURRENT DYNAMOMETER

Franz Diesfeld, Kiel, Germany, assignor to J. P. Sauer & Sohn, Gesellschaft mit beschränkter Haftung, Eckernfoerde, Norderschanze, Germany Filed Sept. 10, 1957, Ser. No. 683,101

3 Claims. (Cl. 73—134)

The present invention relates to an eddy current dynamometer.

In order to create independence from the street in the development of motors and transfer elements of vehicles, as well as of their series control, an eddy current dynamometer has been developed as a carrying roller, through which the output of the motor at different loads may be ascertained over the drive wheel of the vehicle and the ignition and the carburator may be adjusted to highest outputs.

The classical principle of the eddy current brake is known, wherein a copper or aluminum disc turns between two rows of annularly disposed and alternately excited magnetic poles, whereby one of the poles is disposed on one side of the disc and the other pole on the opposite side thereof.

This known principle has the drawbacks of insufficient cooling possibility for the disc, unsatisfactory exploitation of the diameter of the disc, swinging occurrences at electrically favorable thickness of the material of the disc and torque-reduction upon reaching a highest point with an increasing number of revolutions.

Eddy current brakes are also known, wherein the power is transmitted from a driving part to a driven part by means of eddy currents created by a magnetic field, whereby one of the parts has a surface receiving the stream of the lines of force and the other of the parts has a surface concentrating locally the stream of the lines of force, and means are provided for feeding a cooling liquid in form of a thin film between the two parts and to maintain the same in contact with the surface receiving the stream of the lines of force. It is, however, very difficult to seal off such eddy current brakes, because the cooling liquid contacts also the rotating member. Furthermore, corrosions and cavities occur just on those places, which are of importance for the magnetic flow. Also liquid friction between the stator and the rotor is created, which brings about an increase in the minimum brake values.

An eddy current-dynamometer is also known, the smooth stator of which has water-cooling and the rotor of which is equipped with teeth. These instruments cannot be used, however, directly for the testing of vehicles; they must be coupled with a carrying roller path as a separate braking aggregate, an expedient which proved to be practically uneconomical.

Carrying roller-testing stands have been made before, wherein a generator is provided within the carrying roller, which generator works either into a network or into resistances. Feeding into an existing network is only possible, however, if continuously constant brake loads are run. The provision of load-resistances makes the unit appreciably more expensive. Furthermore the dimensions of the units increase appreciably and the number of revolutions is within the range conventional for generators, because the higher numbers of revolutions require extremely complicated and expensive armatures.

Finally, eddy current brakes are also known, in the outside disposed stator of which is arranged an inner metal cylinder. This arrangement has the disadvantage, that the cylinder is not cooled directly and that the cylinder cannot expand equally in outward direction. In case of heat development it will expand irregularly inwardly into the bore and will engage the rotor, unless the gap between the stator and the rotor is kept uneconomically wide.

Furthermore, electromagnetic brakes have been proposed before which combine a magnet with toothed poles, a toothed magnetic armature for the magnet and a single winding for the magnet. One of the members is rotatable relative to the other and the number of teeth on one of the members is a multiple of the number of teeth on the other of the members. These electromagnetic brakes have the drawback that they have air cooling only and are not suitable, therefore, for long time operation; they have also poles with changing polarity, so that the braking moment does not rise constantly, but rather drops. They cannot be used as carrying roller brakes.

Eddy current brakes are also known the outer member of which is non-rotatable, so that again a use as a carrying roller brake is impossible.

It is another object of the present invention to provide an eddy current dynamometer as a carrying roller by which the output of the motor of a vehicle may be determined at different loads by means of the driving wheel or wheels of the vehicle, as well as the ignition and the carburetor may be adjusted to achieve the highest output. This end is achieved in such a manner that the rotor is disposed on the outside and the stator is disposed inside of the rotor. Said rotor is equipped with ring-shaped coils and teeth on its side opposite the stator, and its outer periphery is formed as a smooth cylinder to provide a roller surface. The stator is mounted with its shaft in roller bearings and has an outer cylinder which is contracted on its iron parts, water-cooled, smooth and of metal which is a good electrical conductor, preferably of copper or aluminum. One or a plurality of annular, water-tight exciting coils are disposed in recesses of said stator inside of the outer cylinder, which exciting coils are retained axially by means of properly profiled concentrical closing covers.

It is also an object of the present invention to provide an eddy current dynamometer wherein a brush holder as well as a balancing weight, for balancing the masses of the cooling conduits, is disposed on the stator shaft and the latter carries also a measuring arm which transfers the torque to the measuring chamber.

It is yet a still further object of the present invention to provide bores in the stator shaft, as well as in the closure covers and connecting channels in the stator for the feeding and removing, respectively, the cooling water which runs through the spool-chamber of the stator and engages directly the metal-cylinder. Pipe connectors disposed on the stator-shaft, cooling water pipes and rubber hoses bring about the connection with the water network. The rotor comprises coaxially disposed rings of L-shaped cross-section, which are disposed adjacent to each other, and also closure rings and it is disposed within a hollow cylinder serving as a running drum which is carried by end shield bearing brackets rotatably mounted on the stator-shaft by means of ball-bearings. Each ring-shaped exciting-coil lies between a ring of L-shaped cross-section and a closure ring. The rings of L-shaped cross-section, as well as the closure rings have teeth in their bores. The exciting current is fed to the ring-coils over slip rings and brushes.

With these and other objects in view which will become apparent in the following detailed description, the present invention will be clearly understood in connection with the accompanying drawing, in which:

Figure 1 is a longitudinal section of the eddy current brake of the present invention; and Fig. 2 is a fragmentary cross-section thereof.

Referring now to the drawing, the eddy current brake comprises a stator 3 having a shaft 1 and is rotatably mounted in ball bearings 2, which stator 3 has at its periphery one or more deep annular recesses adapted to receive the ring-shaped, watertight exciting coils 4. The latter are maintained in axial position by means of corresponding profiled closure covers 5, which sit on the shaft 1 of the stator 3. The latter is surrounded by a metal-cylinder 6 of copper or aluminum. The shaft 1 of the stator 3 has axial bores 7 at both of its ends, which bores 7 lead beyond the range of the closure cover 5. A radial bore 8 communicates with the axial bore 7 and extends from the latter to the periphery of the shaft 1. The axial bores 7 are sealed off at both ends. The pipe connections 9 are disposed in the shaft 1 adjacent the two ball bearings 2 of the shaft 1 for the feeding and removal of the cooling water through solid pipes 10 and rubber hoses 11 which cooling water is fed into the bores 7 and, thereby, into the closure covers 5. Connecting channels 12 lead in the two closure covers 5 on the outer periphery from the radial bore to the chambers formed between the exciting coil 4 and the metal-cylinder 6. The median part of the stator 3 has a connecting channel 13 from one to the other coil chamber 14. The shaft 1 carries on one side a counter-weight 15 for balancing the masses of the pipes 10 for the cooling water. The measuring arm 16 is provided for the transfer of the torque to the measuring chamber 17. The rotor formed as a running drum is rotatably mounted on the shaft 1 with its end shield bearing brackets 18 by means of the ball bearings 19. The two end shield bearing brackets 18 are connected with each other by means of a hollow cylinder 20, which serves as a runway for the drive wheel 21 of the vehicle to be tested. Coaxial rings 22 of L-shaped cross-section are disposed within the hollow cylinder 20 adjacent each other. The rings 22, as well as the closure rings 23 have teeth 24 in its bore, which teeth 24 form a plurality of poles. The exciting current for the rotor-coils 25 is fed over slip rings 26 and brushes 27, the brushholder 28 being secured to the shaft 1.

The application and function of the eddy current dynamometer is as follows:

The immovable vehicle stands with its wheels 21 to be braked on the hollow cylinder 20 or runway of the rotor and causes the latter to turn. Since teeth 24 are confronted in the rotor to the ring-shaped poles with smooth surface and surrounding metal cylinder 6, the flux pulsates according to the pitch of the teeth. The exciting coils 4 in the stator 3 and the exciting coils 25 in the rotor are in the circuit set in such a manner, that their effect adds up. Similarly to the classical disc-brake, the eddy current dynamometer according to the present invention has likewise poles of opposite polarity on both sides of a metal face. In contrast with the classical principle, however, the poles do not change their polarity on one side of the metal face. In this manner it is achieved that the brake-moment increases steadily with the increase of the number of revolutions and does not fall off. During a relative motion between the rotor and the stator magnetic lines of force, which flow from the teeth poles 24 of the rotor to the counter-pole of the smooth stator 3, are cut by means of the metal-cylinder 6. In this manner eddy currents are induced in the metal cylinder 6, which currents are here transformed into heat. The teeth-poles 24 in the rotor cause a concentration of the magnetic lines of force while the ring-shaped poles of the stator 3, which poles are smooth on their entire periphery, are excited and thus are premagnetized for closing the magnetic circuit through the metal-cylinder 6 over the pole teeth 24 of the rotor. It is of advantage that an air gap is provided only between the rotor teeth 24 and the metal-cylinder 6, while no gap exists between the metal-cylinder 6 and the stator poles.

Due to the arrangement of a metal-cylinder 6, the effective diameter of the cylinder 6 is completely used, in contrast to a disc which outside of its effective diameter requires a reinforcement ring due to the occurring centrifugal forces, which in turn again cause higher velocities on the periphery. The permissible number of revolutions of a rotating disc, particularly with the electrically favorable materials, as copper and aluminum, is limited, while the metal-cylinder 6 is disposed in the relatively immovable stator 3 and, thus, is not influenced by the number of revolutions, so that it can have a comparatively thin wall. The cooling of a rotating disc is very difficult in case of greater brake moments, while the present arrangement of the cylinder permits of a good cooling. The cooling water enters on one side into the bore 7 of the shaft 1, flows from there into the radial bore 8 of the closure cover 5 and then into the chambers 14 between the coil 4 and the metal-cylinder 6. By the feeding of cooling water into the bores 7 of the shaft 1, the bearing seats are cooled simultaneously. The gap between the rotor and the stator may be kept very small, since it is only required for the radial play in the bearings and swinging movements, as experienced in connection with discs, do not occur. Furthermore, if any heat tensions should occur, they are distributed equally over the entire periphery of the metal-cylinder.

Due to the fact that the rotor formed as a running drum is mounted on the shaft 1 of the stator together with its end shield bearing brackets by means of the ball bearings 19, the bearing friction originating with these bearings 19 is included in the measure of the torque. Since the brushholder 28 is secured to the shaft 1 of the stator, the brush friction is likewise measured and forms together with the friction of the ball bearings the lower limit of the measurable values.

Since eddy currents are lost currents, the requirement for regulating resistances and dissipating resistances, respectively, is completely eliminated. Furthermore, the size of eddy current brakes is at an average ⅓ of those of brake-dynamos; the number of revolutions may be also much higher with eddy current brakes (about 40,000 r.p.m.) than with brake-dynamos, whereby the manufacturing costs are reduced to about one fourth. Finally, the eddy current brake is more robust than a brake dynamo and cannot be practically overloaded. A burning out of the coils and, thereby, repair-work connected therewith, does not occur.

By the use of a plurality of eddy current dynamometers of the present invention, it is possible to brake a plurality of wheels of a vehicle.

While I have disclosed one embodiment of the present invention, it is to be understood that this embodiment is given by example only and not in a limiting sense, the scope of the present invention being determined by the objects and the claims.

I claim:

1. An eddy current dynamometer comprising an outside disposed rotor and an inside disposed stator, said rotor having ring coils and teeth at its side opposite said stator and formed at its outer periphery as a smooth cylinder, a shaft rotatably mounted on roller bearings, said shaft supporting said stator, and said stator having a water-cooled smooth outer cylinder of a metal which is a good electrical conductor, said outer cylinder being contracted on said stator, said stator defining at least one recess disposed at its periphery, at least one water-tight annular exciting coil being disposed in said recess of said stator within said outer cylinder, and a cover member retaining said exciting coil in said recess of said stator, and a brush holder secured to said shaft, cooling conduits secured to said stator for feeding cooling water to said stator, a counter weight mounted on said shaft for balancing said cooling conduits, and a measuring arm carried by said counter weight and a measuring box, said measuring arm being adapted to transfer the torque to said measuring box.

2. The eddy current dynamometer, as set forth in claim 1, wherein said cooling conduits comprise a bore disposed axially in said shaft and channels leading from said bore to said recess receiving said exciting coil, in order to feed to and remove from said recess cooling liquid, the latter engaging during said flow the inner face of said outer cylinder and additional water pipes and rubber hoses as well as pipe connections connecting said water pipes with said axial bore in said shaft, for connection of said axial bore in said shaft with a water feeding network.

3. The eddy current dynamometer, as set forth in claim 1, wherein said rotor is mounted on said shaft by means of bearing end members connected by a hollow cylinder and equipped with roller bearings comprising coaxially arranged ring members of L-shaped cross-section as well as connecting rings having teeth, and annular exciting coils being disposed between one of said coaxial rings and an end ring, and sliding rings mounted on said end portions and brushes engaging said sliding rings for feeding current to said exciting coils of said rotor.

References Cited in the file of this patent

UNITED STATES PATENTS

| | | |
|---|---|---|
| 227,845 | Sawyer | May 18, 1880 |
| 1,954,809 | Fraser | Apr. 17, 1934 |
| 2,197,990 | Winther | Apr. 23, 1940 |

FOREIGN PATENTS

| | | |
|---|---|---|
| 576,689 | Great Britain | Apr. 16, 1946 |
| 998,724 | France | Sept. 26, 1951 |